Patented May 9, 1933

1,907,891

UNITED STATES PATENT OFFICE

GERHARD STEIMMIG AND MAX WITTWER, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF CARBONIC ACID ESTERS OF THE GLYCOLS

No Drawing. Application filed October 29, 1929, Serial No. 403,355, and in Germany November 14, 1928.

The present invention relates to the production of carbonic acid esters of the glycols.

Carbonic acid esters of the glycols have hitherto only been obtained with difficulties; the simplest method has been to prepare for example ethylene glycol carbonate from ethylene glycol or disodium ethylene glycol and phosgene or chlorocarbonic acid esters, but the yields obtained have been unsatisfactory.

We have now found that carbonic acid esters of the glycols are obtained in excellent yields by acting with carbonates of the alkali metals, i. e. carbonates or bicarbonates on vicinal glycol chlorhydrins, if desired at a pressure above atmospheric pressure. The term "vicinal" is intended to define glycol chlorhydrins in which the hydroxyl group and the chlorine atom are connected to vicinal carbon atoms, as for example in the so-called α, β- or 1.2-positions. The reaction is preferably performed while warming, the common salt and water being removed after the reaction and the reaction mixture being then distilled or subjected to freezing. The water may be continuously removed during the reaction by adding to the reaction mixture a vehicle, forming a binary mixture of low boiling point with water, such as ethylene chloride, benzene and the like.

The following examples will further illustrate the nature of this invention but the invention is not restricted to these examples. The parts are by weight.

Example 1

1 molecular proportion of sodium bicarbonate is added to 1 molecular proportion of ethylene chlorhydrin while stirring, and the whole is then heated for several hours. As soon as the sodium bicarbonate has disappeared the unconverted ethylene chlorhydin and the water formed are distilled off. The liquid residue, while still hot, is separated from the precipitated common salt, and it solidifies after cooling into a pulp of crystals of ethylene glycol carbonate having the formula:

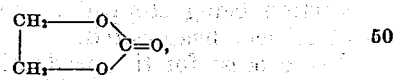

the yield being about 80 per cent of the theoretical yield.

Example 2

1,000 parts of a 40 per cent aqueous solution of ethylene chlorhydrin are slowly heated to 60° centigrade together with 250 parts of sodium bicarbonate. When the bicarbonate has been consumed the water, the excess of ethylene chlorhydrin and any small quantity of glycol formed are distilled off in vacuo, and the residue is worked up as described in Example 1. The yield obtained of ethylene glycol carbonate is from 60 to 70 per cent of the theoretical yield.

Example 3

1,000 parts of a 40 per cent aqueous solution of ethylene chlorhydrin are heated together with 200 parts of sodium carbonate to from 60° to 70° C. until the alkali has disappeared. After distilling off the water the mixture of ethylene glycol and ethylene glycol carbonate is distilled in vacuo. By cooling the distillate the carbonate is obtained in a yield of from 50 to 60 per cent of the theoretical yield.

Example 4

2 molecular proportions of 1.2-propylene chlorhydrin are boiled under reflux together with 1 molecular proportion of sodium bicarbonate. The water formed during the reaction is continuously removed by adding a vehicle, forming a binary mixture of low boiling point with water, such as ethylene chloride, benzene and the like. As soon as the alkali has disappeared the solution is separated from common salt by filtering by suction and the remainders of the chlorhydrin are removed. The mixture of 1.2-propylene glycol and 1.2-propylene glycol carbonate containing about 30 per cent of the latter is then fractionally distilled, the pure carbonate being then obtained by freezing the distillate. The 1.2-propylene glycol carbonate is a viscous difficultly water-soluble liquid having a specific gravity of about 1.21 and can be distilled at about 12 millimetres mercury at 110° C. with partial decomposition.

What we claim is:—

1. The process for the production of carbonic esters of glycols which comprises acting with an alkali metal carbonate on a vicinal glycol chlorhydrin, the reaction being stopped as soon as the said alkali has disappeared.

2. The process for the production of carbonic esters of glycols which comprises acting with an alkali metal carbonate on a vicinal glycol chlorhydrin while warming, the reaction being stopped as soon as the said alkali has disappeared.

3. The process for the production of carbonic esters of glycols which comprises warming an alkali metal carbonate with a vicinal glycol chlorhydrin and an organic liquid capable of forming a binary mixture of low boiling point with water while continuously distilling off such binary mixture, the reaction being stopped as soon as the said alkali has disappeared.

4. The process for the production of carbonic esters of glycols which comprises acting with a carbonate of sodium on a vicinal glycol chlorhydrin while warming, the reaction being stopped as soon as the said alkali has disappeared.

5. The process for the production of carbonic esters of glycols which comprises acting with a carbonate of sodium on 1.2-propylene chlorhydrin while warming, the reaction being stopped as soon as the said alkali has disappeared.

6. 1.2-propylene glycol carbonate which is a difficultly water-soluble liquid having a specific gravity of about 1.21 and distilling at 110° C. at about 12 millimetres mercury with partial decomposition.

7. The process for the production of carbonic esters of glycols which comprises refluxing a carbonate of sodium with 1.2-propylene chlorhydrin, the reaction being stopped as soon as the said alkali has disappeared.

8. The process for the production of carbonic esters of glycols which comprises heating to boiling a mixture of a carbonate of sodium with 1.2-propylene chlorhydrin and ethylene chloride and distilling off a binary mixture of ethylene chloride and water, the reaction being stopped as soon as the said alkali has disappeared.

9. The process for the production of carbonic esters of glycols which comprises heating to boiling a mixture of a carbonate of sodium with 1.2-propylene chlorhydrin and benzene and distilling off a binary mixture of benzene and water, the reaction being stopped as soon as the said alkali has disappeared.

10. The process for the production of carbonic esters of glycols which comprises heating ethylene chlorhydrin with a carbonate of sodium to a temperature of from 60 to 70° C., the reaction being stopped as soon as the said alkali has disappeared.

11. The process for the production of carbonic esters of glycols which comprises acting with an alkali metal carbonate on more than an equimolecular proportion of a vicinal glycol chlorhydrin, the reaction being stopped as soon as the said alkali has disappeared.

In testimony whereof we have hereunto set our hands.

GERHARD STEIMMIG.
MAX WITTWER.